US005506050A

United States Patent [19]

Kurachi et al.

[11] Patent Number: 5,506,050

[45] Date of Patent: Apr. 9, 1996

[54] PLASTIC FILM SUBJECTED TO ANTISTATIC PREVENTION AND SILVER HALIDE PHOTOGRAPHIC LIGHT-SENSITIVE MATERIAL USING THE SAME

[75] Inventors: Yasuo Kurachi; Kaoru Y. Aegashi; Yoichi Saito; Yoshihiro Wada; Akihisa Nakajima, all of Tokyo, Japan

[73] Assignee: Konica Corporation, Japan

[21] Appl. No.: 293,057

[22] Filed: Aug. 19, 1994

Related U.S. Application Data

[62] Division of Ser. No. 201,532, Feb. 25, 1990, Pat. No. 5,364,751.

[30] Foreign Application Priority Data

Mar. 1, 1993 [JP] Japan .......................................... 40048

[51] Int. Cl.$^6$ ................................ B32B 5/16; G03C 1/76

[52] U.S. Cl. .......................... 428/327; 428/332; 430/523; 430/527; 430/531; 524/80

[58] Field of Search .................................... 428/323, 327, 428/332; 430/523, 527, 531; 524/80

[56] References Cited

U.S. PATENT DOCUMENTS

| | | | |
|---|---|---|---|
| 3,269,252 | 8/1966 | de Keyser et al. | 430/496 |
| 3,280,222 | 10/1966 | Kober et al. | 558/80 |
| 3,835,102 | 9/1974 | Shinohara et al. | 528/362 |
| 3,963,498 | 6/1976 | Trevoy | 430/631 |

FOREIGN PATENT DOCUMENTS

| | | | |
|---|---|---|---|
| 61-000256 | 1/1986 | Japan . | |
| 26443 | 9/1992 | Japan | G03C 1/85 |
| 8978 | 8/1990 | WIPO | G03C 1/85 |

*Primary Examiner*—D. S. Nakarani
*Assistant Examiner*—H. Thi Le
*Attorney, Agent, or Firm*—Jordan B. Bierman; Bierman and Muserlian

[57] ABSTRACT

A plastic film material comprising a layer is disclosed, the layer containing in admixture a binder and particles comprising a compound in an amount of 70% or more by weight of the particles, the particles having a volume specific resistance of not more than $10^9$ Ωcm and the compound comprising an element selected from the group consisting of H, B, C, N, O, F, P, S and Cl.

7 Claims, No Drawings

PLASTIC FILM SUBJECTED TO ANTISTATIC PREVENTION AND SILVER HALIDE PHOTOGRAPHIC LIGHT-SENSITIVE MATERIAL USING THE SAME

This application is a division of application Ser. No. 08/201,532, filed Feb. 25, 1994, now U.S. Pat. No. 5,364,751.

FIELD OF THE INVENTION

The present invention relates to a plastic film improved in its antistatic property so as to be less affected by the change of humidity. It can be used for a magnetic tape, a floppy disk, a flexible board, a substrate for a membrane switch and a recording sheet for a printer. Since a film transparent sufficiently can be made, it can be used for an overhead projector film, a liquid crystal display apparatus, a touch panel and a stained glass. In addition, it can also be used for a photographic light-sensitive material because the excellent degree of clearness of the plastic film does not adversely affect the photographic characteristics of the photographic light-sensitive material.

BACKGROUND OF THE INVENTION

Because of commonly strong static charge build-up, plastic films have been hitherto often limited in their use other than the use taking advantage of such properties. For example, light-sensitive phiorographic materials commonly make use of plastic film as a support having electrical insulation properties. Such materials belong to what is called composite materials, comprised of a support and a light-sensitive photographic material layer. Hence the light-sensitive photographic materials tend to be statically charged when, during their manufacture and use, they come into contact with the surface of a material of the same or different kind or they are separated therefrom. Most static charges accumulated as a result of static charging cause various difficulties. The most important difficulty is what is called static marks, which are spots or branch-type or feather-type lines occurring during the photographic processing of the light sensitive photographic materials whose light-sensitive silver halide emulsion layers have been sensitized as a result of the discharge of static electricity accumulated before the photographic processing. When, for example, this phenomenon occurs in medical or industrial X-ray films, it leads to a very dangerous determination. This phenomenon becomes known only when the photographic films have been processed, and is one of very difficult problems. These accumulated static charges may also cause troubles such that dust adheres to a plastic film surface and no uniform coating on the film surface can be carried out.

Such troubles caused by static charging may also occur in many cases besides the foregoing. For example, in the course of manufacture, the troubles may be caused by contact friction between photographic films and rollers and by separation of emulsion sides from support sides in the course of winding-up or unwinding of photographic films. In finished products, the troubles may be caused by separation of emulsion sides from base sides when photographic films are wound up and changeover is made, and by contact and separation occurring between X-ray films and machine parts during automatic photographing or between X-ray films and intensifying screens. The troubles may also be caused by contact with other packaging materials. The static marks of light-sensitive photographic materials, caused by accumulation of such static charges become remarkable with an increase in sensitivity of light-sensitive photographic materials and an increase in processing speed thereof. In particular, in these days, static marks tend to occur since photographic materials have been made to have a higher sensitivity and are often handled under severe conditions such that light-sensitive coating is carried out at a higher speed, or photographs are taken at a higher speed and automatic processing is carried out at a higher speed.

Moreover, in recent years, adhesion of dust after photographic processing has come into question, and it is sought to make an improvement so that antistatic properties can also be retained after the processing.

The best method for eliminating such difficulties due to static is to increase electrical conductivity of substances so that static charges can be dissipated in a short time before the discharge Of accumulated electricity takes place.

Accordingly, methods of improving the conductivity of supports of light-sensitive photographic materials or that of surface layers of various coatings have been hitherto proposed and it has been attempted to utilize various hygroscopic substances and water -soluble inorganic salts and certain types of surface active agents and polymers. For example, Japanese Patent Publications Open to Public Inspection [hereinafter referred to as Japanese Patent O.P.I. Publication(s)] No. 91165/1974 and No. 121523/1974 disclose examples in which ion type polymers having a dissociative group in the polymer main chain are applied. Other invention is also known which relates to conductive polymers as disclosed in Japanese Patent O.P.I. Publications No. 9689/1990 and No. 182491/1990 and surface active agents as disclosed in Japanese Patent O.P.I. Publications No. 55541/1988, No. 148254/1988, No. 148256/1988 and No. 314191/1989.

These many substances, however, have a specificity depending on the types of film supports and the difference in photographic compositions and can give good results on certain types of film supports, photographic emulsions and photographic components. They, however, not only can be of no use at all for antistatic in the case of other different types of film supports and photographic components, but also may adversely affect photographic performance. Another important disadvantage thereof is that most of these substances lose their function as a conductive layer when used in an environment of a low humidity.

For the purpose of preventing the deterioration of performance in an environment of low humidity, Japanese Patent Examined Publications No. 6616/1960 and No. 20735/1989 disclose techniques in which metal oxides are used as antistatic treatments. The former discloses a method in which a colloidal sol dispersion is used. The latter discloses a method in which a highly crystalline metal oxide powder having been treated at a high temperature is used so that a problem concerning conductivity in the former can be eliminated. In the latter technique, however, it is stated that because of the use of a highly crystalline powder its particle diameter, the ratio of particles to a binder, etc. must be taken into account as countermeasures to the scatter of light. Japanese Patent O.P.I. Publication No. 29134/1992 also discloses a method in which a particulate metal oxide and a fibrous metal oxide are employed in conductive materials used in light-sensitive photographic materials for the purpose of not only improving performance in an environment of low humidity but also eliminating other disadvantages. There, however, have remained a problem concerning the amount of the oxides added.

Thus, in relation to light-sensitive photographic materials provided with a layer containing conductive fine metal particles , problems nave remained unsettled yet even though means for preventing the deterioration of performance in an environment of low humidity have been studied for 30 years or more since the above techniques were disclosed in Japanese Patent Examined Publication No. 6616/1960.

For example, in the case when a layer containing such conductive fine metal particles is provided adjoiningly to a silver halide layer containing silver halides, there is the problem that pressure marks or abrasion marks tend to occur in images as a result of any friction caused when light-sensitive photographic materials are handled. For another example, in the case when such particles are used as a mixture with a binder, there is the problem that fine particles present on the surface of light sensitive photographic materials may fall as a result of any friction caused when light-sensitive photographic materials are manufactured or handled, and hence may adhere to rollers in the course of the manufacture to scratch the products being carried. In addition, materials mainly composed of these metal elements generally have a high specific gravity. Accordingly, when they are coated on a photographic light-sensitive material, problems such as precipitation of fine particles are caused, resulting in an adverse effect on uniformity of a coating solution and preservability.

SUMMARY OF THE INVENTION

Accordingly, an object of the present invention is to provide a plastic film material or a photographic light-sensitive material wherein pressure fogging and scratches do not occur, transparency is excellent and a high antistatic property can be kept even under a low humidity condition.

The above object of the invention has been attained by a plastic film material comprising particles comprised of 70% or more by weight of a compound consisting of an element selected from H, B, C, N, O, F, P, S and Cl, said particles having a volume specific resistance of $10^9$ Ωcm or less.

The above object of the invention has been attained preferably by a plastic film material comprising particles having a volume specific resistance of not more than $10^9$ Ωcm and comprised of 70% or more by weight of a compound represented by the following formula (I):

$$(N{=}P(X-R)_a(X'-R')_b)_n \qquad \text{formula (I)}$$

wherein X and X' each represent a group selected from —O— —NH— and —NR"—; R, R' and R" each represent a group comprising at least one element selected from H, B, C, N, O, F, P, S or Cl and n is an integer of 3 or more, provided that a+b=2, wherein a and b each represent a positive number.

It is preferable that R, R' and R" each represent an organic group.

The plastic film material of the invention preferably comprises particles comprised of 70% or more by weight of an electron or ion conductive polymer, and this invention may preferably comprise particles comprised of 70% or more by weight of a carbon material. The particles preferably have an average particle diameter of 1 μm or less and/or have a specific gravity of 3.0 or less.

The plastic film material of the present invention is most preferably used as a support for a photographic film. On such occasion, it has a noticeable effect of the present invention.

This represents that the material of the present invention has solved the above-mentioned existing problems by incorporating specific fine particles in which the main components are not a metal element.

The present invention can be used for a magnetic tape, a floppy disk, a flexible board, a substrate for a membrane switch and a recording sheet for a printer. Since a film transparent sufficiently can be offered, it can be used for an OHP film, a liquid crystal display apparatus, a touch panel and a stained glass. In addition, it can also be used for a photographic light-sensitive material because the excellent degree of clearness of the plastic film does not adversely affect the photographic characteristics of the photographic light-sensitive material.

As known in the art, the conductivity of metal oxide powders is exhibited by charge carriers such as cations, anions or electrons or positive holes present in oxides. The total electrical conductivity thereof (Pt) is expressed as follows:

$$\sigma t = \sigma c + \sigma a + \sigma n + \sigma p$$

wherein

σc is electrical conductivity of cations;

σa is electrical conductivity of anions;

σn is electrical conductivity of electrons;

σp is electrical Conductivity of positive holes.

When the charge carriers are mainly ions, a solid electrolyte is formed. When the charge carriers are electrons, semiconductors are formed. In usual instances, conductors comprised of a mixture of the both are formed, and non-stoichiometric compounds such as oxygen-deficient oxides, metal-excess oxides, metal-deficient oxides and oxygen-excess oxides are formed as semiconductors. While the conductivity of many conductive materials is exhibited in the above-mentioned manner, many of conductive or semi-conductive materials have metallic elements as the main components, resulting in the high specific gravity. Accordingly, compounds which are metallic oxides having volume specific resistance of $10^9$ Ωcm or less have so far caused a problem of an uneven coating solution because their precipitation speed is high when they are used as an antistatic material for a transparent film, though they have excellent optical properties.

The present inventors have studied the structure, the constitution elements and the characteristics of conductive or semi-conductive materials to reach the following conclusions for achievement of the present invention.

(1) If the main components of fine particles are non-metallic elements, a specific gravity is lowered so that the problem of precipitation can be solved.

(2) Generally, when a non-metallic element is the main component, conductivity is lowered. However, some materials having non-localized electrons or having an ionic group can make fine particles whose volume specific resistance is not more than $10^9$ Ωcm.

(3) When conductive or semi-conductive materials are mixed with semi-conductive or insulating materials for producing fine particles, fine particles whose volume specific resistance is not more than $10^9$ Ωcm can be produced.

(4) When the specific gravity of material is smaller than a certain specific gravity, the problem of precipitation can be solved even when the specific gravity of the dispersed fine particles are larger than that of the dispersion medium or the average particle diameter is about 1 μm.

Thus, they have reached the present invention.

Namely, the present inventors invented a plastic film material or a silver halide photographic light-sensitive material with improved antistatic properties and excellent optical characteristics containing fine particles whose volume specific resistance is not more than $10^9$ Ωcm and whose main component is non-metallic element.

With regard to volume specific resistance, the volume specific resistance of a large single crystal means that of the crystal itself. When a large single crystal is not obtained, the volume specific resistance of powder or particles, which are not a single crystal, means that of a material molded under a pressure from the powder or particles. When volume specific resistance is unknown, the value is represented by that obtained by dividing volume specific resistance of a material molded from powder under a specific pressure with $10^2$. There is no limitation to the value of specific pressure. However, it is preferably 10 kg/cm$^2$ or more, and more preferably 100 kg/cm$^2$ or more. In general, the relation between pressure applied to powder and volume specific resistance of the molded material tends that, the higher the pressure is, the lower the volume specific resistance is. However, even when an isotropic pressure of 3 ton/cm$^2$ is applied by means of a static water pressure type pressurer, a value lower than the volume specific resistance obtained in a single crystal cannot be obtained. The value becomes higher by about 100 times. Accordingly, a value of the volume specific resistance of a molded material obtained from powder by means of a specific pressure divided by $10^2$ is adopted. The volume specific resistance of the invention is a value obtained by measuring at 25° C. and 20% RH.

In general, a semiconductor material is defined to be a material having a volume specific resistance of less than $10^{12}$ Ωcm, and a conductor material is defined to be a material having a volume specific resistance of less than 10 Ωcm.

Any fine particles can be used for the present invention provided that a volume specific resistance of the main components thereof is not more than $10^9$ Ωcm and the main components are non-metallic elements. Namely, the fine particles may be structured by a single material in which a non-metallic element is the main component or may be combined with other kind of materials. In addition, the structure of the fine particles may be crystalline or amorphous. The higher order structure may have continuously varying composition, regular composition distribution, uneven distribution or the like provided that the structure and the object of the present invention are attained.

For example, fine particles composed of an organic or inorganic polymer having an ionic group and conductive or semi-conductive organic or inorganic polymer having a nonlocalized electron, mixed fine particles of the above-mentioned materials and materials containing minute amount of metallic element and fine particles containing a non-metallic conductive material such as carbon or a semi-conductive material are cited.

More particularly, it can be illustrated that the basic skeleton of the compound constituting the above-mentioned fine particles is composed of a phosphazene derivative comprising a P=N bond and that a part of a substituent is an ionic side chain group, a π electron type side chain group of a compound which offers conductivity and a polyether side chain group. These compounds include a linear compound or cyclic compound with a high molecular weight having a P=N bond. The linear compound is generally synthesized by a ring-opening polymerization of a cyclic compound. It is preferable that, due to its special synthesis method, a cyclic compound can be synthesized at lower cost. The synthesis method of the above-mentioned cyclic compound will be described further in detail. Reaction of a) a halogen atom in a trimer, a tetramer and an n-mer compound wherein a side chained group such as $(PNF_2)_3$, $(PNF_2)_4$ or $(PNF_2)_n$ (n<15) is an F atom, b) a halogen atom in a trimer, a tetramer and an n-mer compound wherein a side chained group such as $(PNCl_2)_3$, $(PNCl_2)_4$ or $(PNCl_2)_n$ (n<15) is a Cl atom, c) a halogen atom in a trimer, a tetramer and an n-mer compound wherein a side chained group such as $(PNBr_2)_3$, $(PNBr_2)_4$ or $(PNBr_2)_n$ (n<15) is an Br atom and d) a halogen atom in a trimer, a tetramer and an n-mer compound wherein a side chained group such as $(PNI_2)_3$, $(PNI_2)_4$ or $(PNI_2)_n$ (n<15) is an I atom with a metallic salt of an aromatic organic compound such as $C_6H_5ONa$, $CH_3C_6H_4ONa$, $(C_6H_5O)_2Ca$ and $CF_3CH_2ONa$ or with a mixture of aromatic group compounds having a hydroxyl group such as $C_6H_5OH$, aliphatic group compounds which can conduct nucleophilic substitution with a halogen atom on a P atom such as an aliphatic alcohol such as $CH_2$ $(CH_3)$=C—$COOCH_2CH_2OH$ or aromatic amines such as $C_6H_5NH_2$ with a chlorine accepting compound such as amines such as aniline, sodium hydroxide and potassium carbonate can be cited.

Phosphagene derivatives are generally synthesized in the above-mentioned manner. However, a synthesis method including a substituting reaction mainly is not limited especially.

The side chain group of an aromatic group is generally defined to be a group derived from a compound having an aromatic group ring.

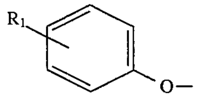

wherein $R_1$ represents a hydrogen atom, a halogen atom, an alkyl group or an alkoxy group, and groups derived from compounds having a hydroxyl group as a functional group on an aromatic group ring such as

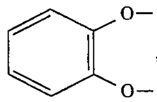

,

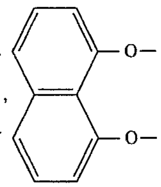

or

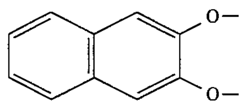

are cited.

In addition, groups derived from compounds having an amino group on an aromatic group ring such as aniline and phenylene diamine as a functional group or groups derived from compounds having a mercapto group on an aromatic group ring such as thiophenol and dimercaptobenzene as a functional group are cited. These aromatic groups may have a sulfonic group. In addition, a combination of a side-chained group is not necessarily composed of a single group. A combination of several groups selected therefrom is allowed. Compounds represented by the above-mentioned formula (I) synthesized by the above-mentioned synthesis method are further preferable. It is preferable that R, R' and R" of the formula (I) is aromatic groups simultaneously.

In addition, conjugated polymers such as tetracyanoquinoedimethane (TCNQ), tetrathiofurbalene (TTF), polyacetylene, coterylene, polyparaphenylene, polythiophene, polypyrrol and polyaniline, polymers to which a suitable dopant is doped and compounds composed of an ionic conductive polymers such as polyvinyl benzene sulfonates, polyvinyl benzyltrimetyl ammonium chloride and quaternary salt polymers can also be used.

In addition, fine particles wherein a carbon material is dispersed in an organic polymer and hardened can be used. With regard to carbon materials, materials produced by means of a carbonating process with an organic compound as a starting raw material including coke, carbon fiber, glass carbon, thermal-decomposed carbon, whisker and carbon black are cited. Carbon materials include various types depending upon their raw materials. The main components of their structuring elements occupying 90 wt % or more are C, O, H and N in this order from larger %. When the C component contained in compounds is 70 wt % or more, the object of the present invention can be attained.

With regard to a particle diameter of the particles wherein the component of 70 wt % or more is selected from H, B, C, N, O, F, P, S and Cl, the average particle size is not more than 10 μm in terms of smoothness, preferably not more than 1 μm, and more preferably 0.001 to 1.0 μm. Though there is no limitation to the measurement method of average particle size, a method wherein fine particles are dispersed in a suitable solvent and an average particle diameter calculated from a centrifuged precipitation speed is generally adopted. However, the average particle diameter may be calculated through electron micrograph of samples sampled randomly from powder containing fine particles composed of elements selected from H, B, C, N, O, F, P, S and Cl. In addition, there are many methods of measurement for an average particle diameter other than the methods described here. Any method can be used.

With regard to a specific gravity of fine particles constituted of elements selected from H, B, C, N, O, F, P, S and Cl, a measurement method capable of offering a specific gravity nearest that of the material constituting the fine particle is selected. For example, a method wherein, after weight is measured by a chemical balance, the volume of a fine particle is measured by the use of suitable gas or fluid for calculating the specific gravity is ordinarily used. In the present invention, no special limitation is placed on the measurement method of specific gravity. However, the value of the specific gravity of fine particles whose main component is constituted of elements selected from H, B, C, N, O, F, P, S and Cl is preferably 3.0 or less with water at 20° C. as a standard and more preferably, 0.6 to 3.0, in order to avoid a problem of the precipitation of particles in a coating solution.

As a method for producing conductive or semi-conductive particles, any conventional synthesizing methods can be used as far as they can attain the object of the present invention. Any methods capable of attaining the object of the present invention such as, for example, a method to produce fine particles by the use of a spray drying after a compound is dissolved in a suitable solvent, a method to crush a compound with a ball mill and a sand grinder after being dissolved in a solvent, a method to crush a compound by means of a drying type crusher such as a jet mill or to separate the compound into two phases, i.e. a solvent phase and a produced material phase, in manufacturing the compound and a method make particles fine by the use of method to produce a compound in condition that the compound has been separated into two or more phases in advance can be used. In addition, though a method to produce fine particles while a conductive layer is coated and dried is allowed, a method to disperse conductive fine particles stably at the stage of coating and forming a conductive phase.

The above-mentioned particles and conductive polymer compounds are dispersed and dissolved in a binder. Or, powder wherein metal oxidized particles were subjected to surface treatment with an electroconductive polymer or microcapsulating or a powder, after mixing in medium wherein metal oxidized particles are dissolved or dispersed in an electroconductive polymer, subjected to a spray dry method or a freezing drying method may be dispersed and coated.

The added amounts of particles and electroconductive polymer compound are explained as follows: The electroconductive polymer compound are added in an extent that does not deteriorate the physical properties such as electroconductivity. There is no limitation thereto. With regard to the added amount of the particles of the invention, it is ordinarily not more than 60%, preferably not more than 50% and especially preferably not more than 40% in terms of volume fraction. However, it is preferable as the added amount is smaller. The powder is preferably added in a volume fraction of not more than 30%. It may more preferably be in a volume fraction of not more than 20%. However, it is necessary to add in terms of a volume fraction of not less than 0.1% and preferably not less than 0.5%. Some compounds may require its addition in a volume fraction of not less than 1%. However, with regard to added amount, there is no especial limitation in the present invention.

According to this volume fraction, the amount used comes to be reduced to approximately from 0.00005 to 1 g per square meter of a light-sensitive photographic material, so that a desirable transparency and a higher antistatic can be achieved. Hence the electroconductive material can be obtained, and the pressure marks and abrasion marks can be prevented from occurring when light-sensitive photographic materials are handled. In addition, in the case of the above-mentioned added amount, the surface specific resistance of a film obtained in the present invention is less than $10^{13}$ Ωcm so that the antistatic of a film can be attained.

There are no particular limitations on the binder used in the present invention so long as it is capable of forming a film. For example, the binder may include proteins such as gelatin and casein, cellulose compounds such as carboxymethyl cellulose, hydroxyethyl cellulose, acetyl cellulose, diacetyl cellulose and triacetyl cellulose, saccharides such as dextran, agar, sodium alginate and starch derivatives, and synthetic polymers such as polyvinyl alcohol, polyvinyl acetate, polyacrylates, polymethacrylates, polystyrene, polyacrylamide, poly-N-vinyl pyrrolidone, polyester, polyvinyl chloride and polyacrylic acid.

In particular, it is preferred to use gelatin such as lime-treated gelatin, acid-treated gelatin, enzymolyzed gelatin, phthalated gelatin or acetylated gelatin, acetyl cellulose, diacetyl cellulose, triacetyl cellulose, polyvinyl acetate, polyvinyl alcohol , polybutyl acrylate, polyacrylamide, or dextran.

As a dispersion method of a conductive substance or semiconductor grains into a binder, a method to utilize free rotation movement, a method to utilize hindrance movement inside a vessel provided with a hindrance plate, a method to utilize tilting movement wherein a sealed vessel is rotated around the horizontal axis, a method to shake a vessel upward and downward and a method to utilize cutting strength on a roll. Any method may be chosen as far as not preventing the object of the present invention. It is preferable, in one of these method, to mix a conductive substance or semiconductor grains. For example, a method to utilize rotation movement wherein grains having a size of 0.1 mm or larger and a method using a sand grinder are cited.

The plastic film material that can be used in the present invention may include, for example, cellulose nitrate film, cellulose acetate film, cellulose acetate butyrate film, cellulose acetate propionate film, polystyrene film, polyethylene terephthalate film and polycarbonate film, as well as laminates of any of these.

These plastic film materials can be used as a support of a silver halide photographic light-sensitive material and may be appropriately selected from transparent supports and opaque supports according to the purpose for which light-sensitive photographic materials are used. The transparent supports are not limited to only colorless transparent ones, and may be colored transparent ones to which a dye or a pigment has been added.

A polyol compound such as ethylene glycol, propylene glycol or 1,1,1-trimethylol propane may also be added to the protective layer or other layer of the present invention. Its addition can bring about a more preferable antistatic effect.

The light-sensitive material according to the present invention may include various light-sensitive materials including usual black and white light-sensitive silver halide photographic materials as exemplified by black and white light-sensitive materials for photographing, X-ray black and white light-sensitive materials and black and white light-sensitive materials for printing, and usual multi-layer color light-sensitive materials as exemplified by color reversal films, color negative films and color positive films. In particular, the present invention is greatly effective for high-temperature processing light-sensitive silver halide halide photographic materials. The light-sensitive silver halide photographic material according to the present invention will be briefly described below.

The binder used in the photographic layers may include proteins such as gelatin and casein, cellulose compounds such as carboxymethyl cellulose, hydroxyethyl cellulose and dextran, sugar derivatives such as agar-agar, sodium alginate and starch derivatives , and synthetic hydrophilic colloids as exemplified by polyvinyl alcohol, poly-N-vinyl pyrrolidone, polyacrylic acid copolymers, polyacrylamide, or derivatives or partially hydrolyzed products of these, which can be used in combination. The gelatin herein noted refers to what is called lime-treated gelatin, acid-treated gelatin or enzymolyzed gelatin.

To the photographic component layers of the present invention, other known surface active agents may also be added alone or in the form of a mixture. They are used as coating aids, and in some instances also used for other purposes, e.g., for emulsification dispersion, sensitization and improvement of other photographic performances.

Invention may contain in its photographic component layers the polymer latex disclosed in U.S. Pat. No. 3,411, 911.

Silver halide grains in emulsions may be those having a regular crystal form such as a cube or an octahedron, or may be those having irregular crystal form such as a sphere, a plate or a potato or those having a composite form of any of these crystal forms They may also be comprised of a mixture of grains having various crystal forms. Tabular grains having a grain diameter five times or larger than grain thickness can be preferably used in the present invention.

In the present invention, light-sensitive silver halide emulsions may be used in the form of a mixture of two or more silver halide emulsions. The emulsions mixed may be different in their particle size, halogen composition, sensitivity and so forth. A substantially non-sensitive emulsion may be mixed in a light-sensitive emulsion, or may be separately used in a separate layer. For example, a light-sensitive emulsion comprising spherical or potato-like grains and a light-sensitive silver halide emulsion comprising tabular grains having a grain diameter five times or larger than grain thickness may be used in the same layer or in different layers. When used in different layers, the light-sensitive silver halide emulsion comprising tabular grains may be present at the side near to the support or on the other hand may be present at the side distant therefrom.

EXAMPLE

Next, the present invention will be explained in detail referring to examples. However, the present invention is not limited thereto.

(Powder P1)

By means of a spray dry method, a 10% $(NP(NHC_6H_5)_{1.6}(NHC_6H_4SO_3H)_{0.4})_3$ solution was sprayed and dried for collecting in a form of powder. With regard to the resulting powder, the average particle diameter was 0.15 μm, the specific gravity was 1.25 and the volume specific resistance was $2.3\times10^4$ Ωcm.

(Powder P2)

By means of a spray dry method, a 10% $(NP(NHC_6H_5)_{1.6}(NHC_6H_4SO_3Na)_{0.4})_4$ solution was sprayed and dried for collecting in a form of powder. With regard to the resulting powder, the average particle diameter was 0.11 μm, the specific gravity was 1.35 and the volume specific resistance was $8.5\times10^4$ Ωcm.

(Powder P3)

Kettin Black (produced by Agzo Corporation) was dispersed in methanol by the use of a ball mill made of SiC so that a 10% Kettin Black dispersion was produced. The Kettin Black dispersion of 500 cc was dropped in 100 cc of polyacrylonitrile emulsion (concentration of 3%) while stirring at high speed by the use of a lab mixer. After the completion of dropping, stirring was continued for a while. The resulting mixed solution was dried and powder was collected by means of the spray dry method. Gray powder was obtained. With regard to the resulting powder, the average particle diameter was 0.2 μm, the specific gravity was 1.3 and the volume specific resistance was $3.5\times10^4$ Ωcm.

(Powder P4)

Kettin Black was dispersed for 2 days in methanol by the use of a ball mill made of SiC so that a 8% Kettin Black dispersion was produced. The Kettin Black dispersion of 500 cc was dropped in 100 cc of polyacrylonitrile emulsion (concentration of 3%) while stirring at high speed by the use of a lab mixer. After the completion of dropping, stirring was continued for a while.. To the solution, tin oxide-sol of 5 cc produced by Tagi Chemical Co., Ltd. was added thereto while stirring. The resulting mixed solution was dried and powder was collected by means of the spray dry method. Gray powder was obtained. With regard to the resulting powder, the average particle diameter was 0.18 μm, the specific gravity was 1.35 and the volume specific resistance was $8.2\times10^4$ Ωcm.

(Example 1)

(Preparation of a support for a silver halide photographic light-sensitive material)

To both sides of a polyethylene terephthalate film having a thickness of 100 μm after biaxial stretching and thermal fixing, corona discharging was applied at 8 W min/$m^2$. The film thus treated was coated on one side thereof with the following subbing coating solution B-1 as described in Japanese Patent O.P.I. Publication No. 19941/1984, so as to form subbing layer B-1 having a dried coating thickness of 0.8 μm, followed by drying at 100° C. for 1 minute. The polyethylene terephthalate film was further coated on the side opposite to the subbing layer B-1 side with the following subbing coating solution B-2 as described in Japanese Patent O.P.I. Publication No. 77439/1984, so as to form subbing layer B-2 having a dried coating thickness of 0.8 μm, followed by drying at 100° C. for 1 minute.

—First subbing layers —

—Subbing coating solution B-1 —

Copolymer latex solution comprised of 30% by weight of butyl acrylate, 20% by weight of t-butyl acrylate, 25% by weight of styrene and 25% by weight of 2-hydroxyethyl acrylate.

| | |
|---|---|
| (solid content: 30%) | 270 g |
| Compound A | 0.6 g |
| Hexamethylene-1,6-bis(ethyleneurea) | 0.8 g |

Made up to 1 liter by adding water.

—Subbing coating solution B-2 —

Copolymer latex solution comprised of 40% by weight of butyl acrylate, 20% by weight of styrene and 40% by weight of glycidyl acrylate

| | |
|---|---|
| (solid content: 30%) | 270 g |
| Compound A | 0.6 g |
| Hexamethylene-1,6-bis(ethyleneurea) | 0.8 g |

Made up to 1 liter by adding water.

— Second subbing layer —

To the above subbing layers B-1 and B-2, corona discharging was applied at 8 W min/$m^2$, and the following coating solution B-3 was coated thereon so as to give a dried coating thickness of 0.1 μm each, followed by drying at 100° C. for 1 minute.

—Subbing coating solution B-3 —

| | |
|---|---|
| Gelatin | 10 g |
| Compound A | 0.4 g |
| Compound B | 0.1 g |
| Silica particles with an average particle diameter of 3 μm | 0.1 g |
| Powder P1 | 5 g |

Made up to 1 liter by adding water.

Compound A

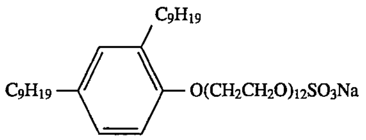

Compound B

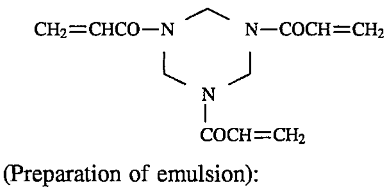

(Preparation of emulsion):

In an acidic atmosphere of pH 3.0, grains containing rhodium in an amount of $10^{-5}$ mol per mol of silver was produced by. controlled double-jet precipitation. The grains were grown in a system containing benzyladenine in an amount of 30 mg per liter of an aqueous 1% gelatin solution. After silver and halide were mixed, 6-methyl-4-hydroxy-1,3,3*a*,7-tetrazaindene was added in an amount of 600 mg per mol of silver halide, followed by Washing to carry out desalting.

Subsequently, 6-methyl-4-hydroxy-1,3,3*a*,7-tetrazaindene was added in an amount of 60 mg per mol of silver halide, and thereafter sulfur sensitization was carried out. After the sulfur sensitization was completed, 6-methyl-4-hydroxy1,3,3*a*,7-tetrazaindene was added as a stabilizer.

(Silver halide emulsion layer):

To the above emulsion, additives were added so as to give the following coating weights, and the emulsion thus prepared was coated on the support described above.

| | |
|---|---|
| Latex polymer: Styrene/butyl acrylate/acrylic acid terpolymer | 1.0 g/$m^2$ |
| Tetraphenylphosphonium chloride | 30 mg/$m^2$ |
| Saponin | 200 mg/$m^2$ |
| Polyethylene glycol | 100 mg/$m^2$ |
| Sodium dodecylbenzenesulfonate | 100 mg/$m^2$ |
| Hydroquinone | 200 mg/$m^2$ |
| Phenidone | 100 mg/$m^2$ |
| Styrene sodium sulfonate/maleic acid copolymer (Mw: 250,000) | 200 mg/$m^2$ |
| Butyl gallate | 500 mg/$m^2$ |
| Tetrazolium compound | 30 mg/$m^2$ |
| 5-Methylbenzotriazole | 30 mg/$m^2$ |
| 2-Mercaptobenzimidazole-5-sulfonic acid | 30 mg/$m^2$ |
| Inert ossein gelatin (isoelectric point: 4.9) | 1.5 g/$m^2$ |
| 1-(p-Acetylamidophenyl)-5-mercaptotetrazole | 30 mg/$m^2$ |
| Silver weight | 2.8 g/$m^2$ |

Tetrazolium compound

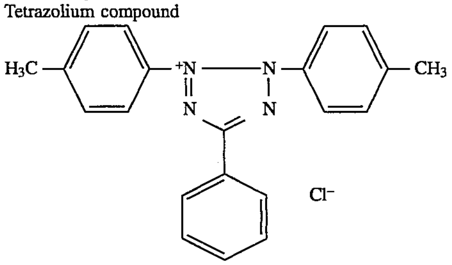

(Emulsion layer protective layer):

To form an emulsion layer protective layer, a coating solution was prepared so as to give the following coating weights, and coated.

| | |
|---|---|
| Fluorinated dioctylsulfosuccinate | 300 mg/$m^2$ |
| Matting agent: Polymethyl methacrylate (average particle diameter: 3.5 μm) | 100 mg/$m^2$ |
| Lithium nitrate | 30 mg/$m^2$ |
| Acid-treated gelatin (isoelectric point: 7.0) | 1.2 g/$m^2$ |
| Colloidal silica | 50 mg/$m^2$ |
| Styrene sodium sulfonate/maleic acid copolymer | 100 mg/$m^2$ |
| Mordant | 30 mg/$m^2$ |
| Dye | 30 mg/$m^2$ |

Mordant

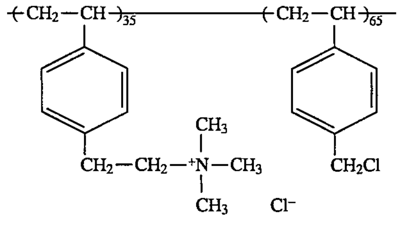

-continued

Dye

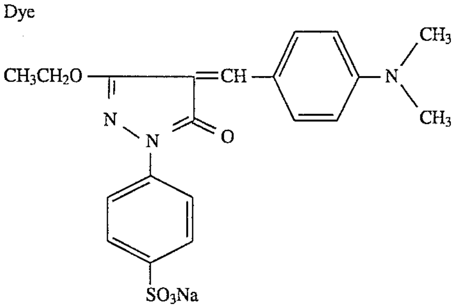

(Backing layer):

The support was coated on the side opposite to the emulsion layer side with the following backing dye solution. The gelatin layer was hardened using glyoxal, 1-oxy-3,5-dichloro-S-triazine sodium salt and a hydroxy-containing epoxy compound (d).

| | |
|---|---|
| Hydroquinone | 100 $mg/m^2$ |
| Phenidone | 30 $mg/m^2$ |
| Latex polymer: | |
| Butyl acrylate/styrene copolymer | 0.5 $g/m^2$ |
| Styrene/maleic acid copolymer | 100 $mg/m^2$ |
| Citric acid | 40 $mg/m^2$ |
| Benzotriazole | 100 $mg/m^2$ |
| Styrene sulfonic acid/maleic acid copolymer | 100 $mg/m^2$ |
| Lithium nitrate | 30 $mg/m^2$ |
| Backing dye (a), (b) and (c) | 40, 30 and 30 $mg/m^2$ |
| Ossein gelatin | 2.0 $g/m^2$ |

Backing dye (a)

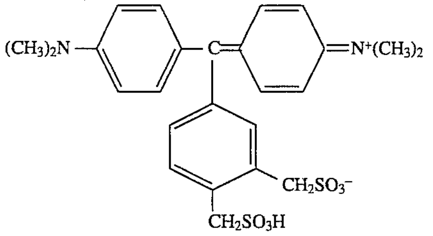

Backing dye (b)

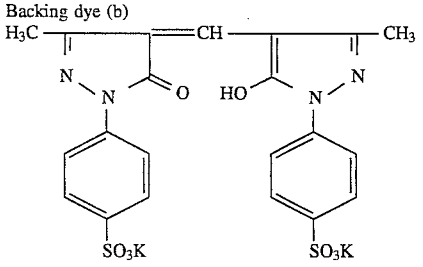

Backing dye (c)

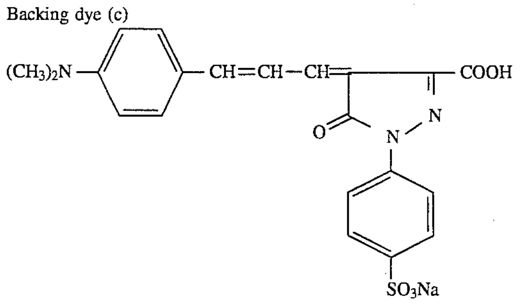

-continued

Epoxy compound (d)

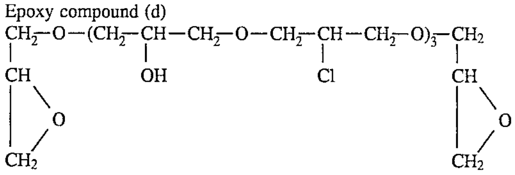

The sample obtained in the manner as described above was subjected to exposure, and photographically processed according to the following processing condition, using the following developing solution and fixing solution. Thereafter, a surface specific resistance test and an ash adhesion test were made. Table 1 shows the results thereof.

—Formulation of developing solution —

| | |
|---|---|
| Hydroquinone | 25 g |
| 1-Phenyl-4,4-dimethyl-3-pyrazolidone | 0.4 g |
| Sodium bromide | 3 g |
| 5-Methylbenzotriazole | 0.3 g |
| 5-Nitroindazole | 0.05 g |
| Diethylaminopropane-1,2-diol | 10 g |
| Potassium sulfite | 90 g |
| Sodium 5-soulfosalicylate | 75 g |
| Sodium ethylenediaminetetraacetate | 2 g |

Made up to 1 liter by adding water.

The pH was adjusted to 11.5 using sodium hydroxide.

—Formulation of fixing solution —

| | |
|---|---|
| (Composition A) | |
| Ammonium thiosulfate (aqueous 72.5 wt % solution) | 240 ml |
| Sodium sulfite | 17 g |
| Sodium acetate trihydrate | 6.5 g |
| Boric acid | 6 g |
| Sodium citrate dihydrate | 2 g |
| Acetic acid (aqueous 90 wt. % solution) | 13.6 ml |
| (Composition B) | |
| Pure water (ion-exchanged water) | 17 ml |
| Sulfuric acid (aqueous 50 wt. % solution) | 3.0 g |
| Aluminum sulfate (aqueous 8.1 wt. % solution in terms of $Al_2O_3$) | 20 g |

When the fixing solution was used, the above compositions A and B were dissolved in this order in 500 ml of water for preparing 1 l and put to use. This fixing solution had a pH of about 5.6.

(Processing conditions):

| Step | Temperature | Time |
|---|---|---|
| Developing | 40° C. | 8 seconds |
| Fixing | 35° C. | 8 seconds |
| Washing | Room temperature | 10 seconds |

(Evaluation of antistatic property: Ash adhesion test):

In an environment of 23° C. and 20%RH, the emulsion side surface of the processed sample was rubbed several times with a rubber roller, and ashes of a cigarette ware brought close to the surface to examine whether or not the ashes were adhered to the surface.

Evaluation was made according to the following:

A: No ashes adhere at all even when brought close up to a distance of 1 cm from the surface.

AB: Ashes adhere when brought close up to a distance of 1 cm to 4 cm from the surface.

C: Ashes adhere when brought close up to a distance of 4 cm to 10 cm from the surface. D:Ashes adhere even when kept at a distance of 10 cm or more.

There is no problem in practical use when evaluated as A or B.

(Measurement of surface specific resistance): The surface specific resistance of the emulsion side surface of the processed sample was measured at an applied voltage of 100V and in an environment of 23° C., 20%RH, using a teraohmmeter VE-30, manufactured by Kawaguchi Denki K. K. Haze test: The above obtained sample was developed without exposure to light and haze was measured using a turbidimeter Model T-2600DA, manufactured by Tokyo Denshoku K. K., and was indicated in %.

(Example 2)

A sample was prepared in the same manner as in Example 1, except that the subbing coating solution B-3 was replaced with a subbing coating solution B-4 to form the subbing second layer. Evaluation was made in the same manner as in Example 1.

—Subbing coating solution B-4 —

| | |
|---|---|
| Gelatin | 10 g |
| Compound A | 0.4 g |
| Compound B | 0.1 g |
| Silica particles with an average particle diameter of 3 μm | 0.1 g |
| Powder P2 | 2.4 g |

Made up to 1 liter by adding water.

(Example 3)

A sample was prepared in the same manner as in Example 1, except that the subbing coating solution B-3 was replaced with subbing coating solution B-5 to form the subbing second layer. Evaluation was made in the same manner as in Example 1.

—Subbing coating solution B-5 —

| | |
|---|---|
| Gelatin | 10 g |
| Compound A | 0.4 g |
| Compound B | 0.1 g |
| Silica particles with an average particle diameter of 3 μm | 0.1 g |
| Powder P3 | 0.8 g |

Made up to 1 liter by adding water.

(Example 4)

A sample was prepared in the same manner as in Example 1, except that subbing coating solution B-3 was replaced with subbing coating solution B-6 to form the subbing second layer. Evaluation was made in the same manner as in Example 1.

—Subbing coating solution B-6 —

| | |
|---|---|
| Gelatin | 10 g |
| Compound A | 0.4 g |
| Compound B | 0.1 g |
| Silica particles with an average particle diameter of 3 μm | 0.1 g |
| Powder P4 | 0.85 g |

Made up to 1 liter by adding water.

(Comparative Example 1)

A sample was prepared in the same manner as in Example 1, except that Subbing coating solution B-3 was replaced with subbing coating solution B-0 to form the subbing second layer. Evaluation was made in the same manner as in Example 1.

—Subbing coating solution B-0 —

| | |
|---|---|
| Gelatin | 10 g |
| Compound A | 0.4 g |
| Compound B | 0.1 g |
| Silica particles with an average particle diameter of 3 μm | 0.1 g |

Made up to 1 liter by adding water.

(Comparative 2)

A sample was prepared in the same manner as in Example 1, except that subbing coating solution B-3 was replaced with subbing coating solution B-01 to form the subbing second layer. Evaluation was made in the same manner as in Example 1. Tin oxide powder contained in the subbing coating solution B-01 means powder wherein tin oxide containing 3% antimony oxide is burned at 900° C. and crushed in a ball mill. The average particle size of this powder was 0.5 μm, the specific gravity was 6.8, and the volume specific resistance was $1\times10^{-5}$ Ωcm.

The subbing coating solution was prepared in the same manner as in Example 1. In a vessel for the coating solution after the coating of a film, precipitation of the tin oxide powder was observed.

—Subbing coating solution B-01 —

| | |
|---|---|
| Gelatin | 10 g |
| Compound A | 0.4 g |
| Compound B | 0.1 g |
| Silica particles with an average particle diameter of 3 μm | 0.1 g |
| Tin oxide powder | 6 g |

Made up to 1 liter by adding water.

TABLE 1

| | Specific(1) gravity | Volume(3) fraction (%) | Surface(2) specific resistance | Dust adherence test | Haze value |
|---|---|---|---|---|---|
| Example 1 | 1.25 | 20% | $2.5 \times 10^{9}$ | A | 4 |
| Example 2 | 1.35 | 15% | $1.8 \times 10^{10}$ | A | 3 |
| Example 3 | 1.3 | 5% | $2.3 \times 10^{10}$ | A | 7 |
| Example 4 | 1.35 | 5% | $6.5 \times 10^{9}$ | A | 6 |
| Comparative 1 | — | 0% | $9.5 \times 10^{13}$ | D | 1 |
| Comparative 2 | 6.8 | 18% | $3.7 \times 10^{12}$ | D | 1 |

(1)Specific gravity of powder added
(2)Surface specific resistance (Ω/□)
(3)Value calculated from the combination ratio As is clear from Table 1, it can be understood that the photographic light-sensitive material of the present invention has a low surface specific resistance, has good results in a dust adherence test and has a favorable transparency. In addition, in the photographic light-sensitive material of the present invention, few pressure fogging and the occurrence of scratches were observed compared to a light-sensitive material provided with a layer containing a conductive metallic fine particles.

What is claimed is:

1. A plastic film material comprising a layer containing particles comprising a compound, in an amount of at least 70% by weight of said particles, said compound being a cyclic compound represented by Formula (I):

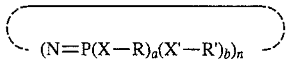

wherein X and X' each represent —O—, —NH—, or —NR"—; R, R', and R" each represent a group comprising at least one element selected from the group consisting of H, B, C, N, O, F, P, S, and Cl; and n is an integer of 3 or more, provided that a+b=2, wherein a and b each represent a positive number, said particles having (a) a volume specific resistance of not more $10^9$ Ωcm and (b) an average particle size of not more than 10 μm.

2. The plastic film material of claim 1, wherein said R, R' and R" in formula (I) each represent an organic group.

3. The plastic film material of claim 1, wherein said R, R' and R" in formula (I) are aromatic groups simultaneously.

4. The plastic film material of claim 1, wherein said particles have an average particle diameter of 1 μm or less.

5. The plastic film material of claim 1, wherein said particles have an average particle diameter of 0.001 to 1 μm.

6. The plastic film material of claim 1, wherein said particles have a specific gravity of 3.0 or less.

7. The plastic film material of claim 1, wherein said particles have an average particle diameter of 1 μm or less and a specific gravity of 3.0 or less.

* * * * *